M. J. F. GENILLON.
VEHICLE WHEEL.
APPLICATION FILED DEC. 30, 1912.
1,102,492.
Patented July 7, 1914.
2 SHEETS—SHEET 1.
FIG. I
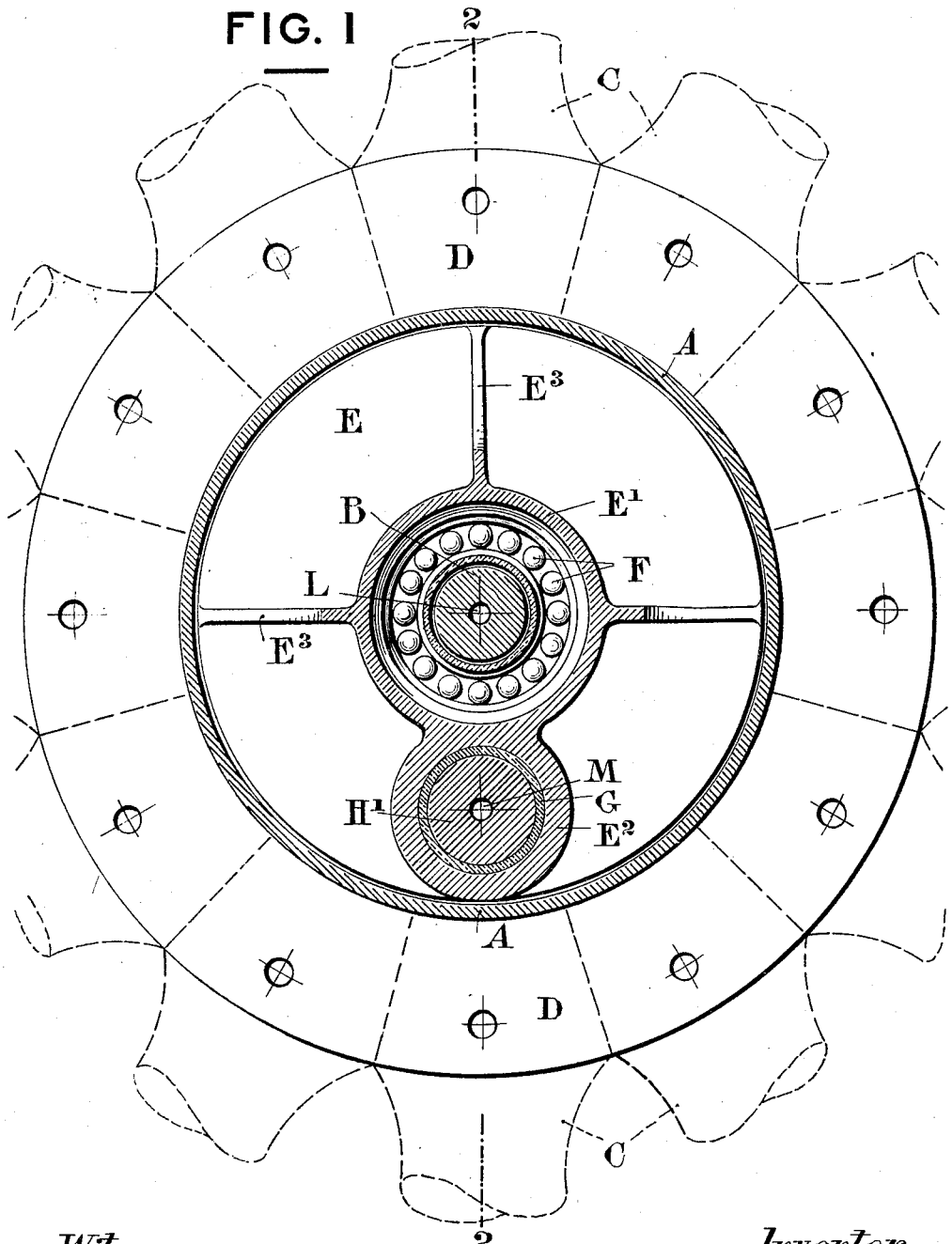
Witnesses
Inventor
Marie Jean François Genillon

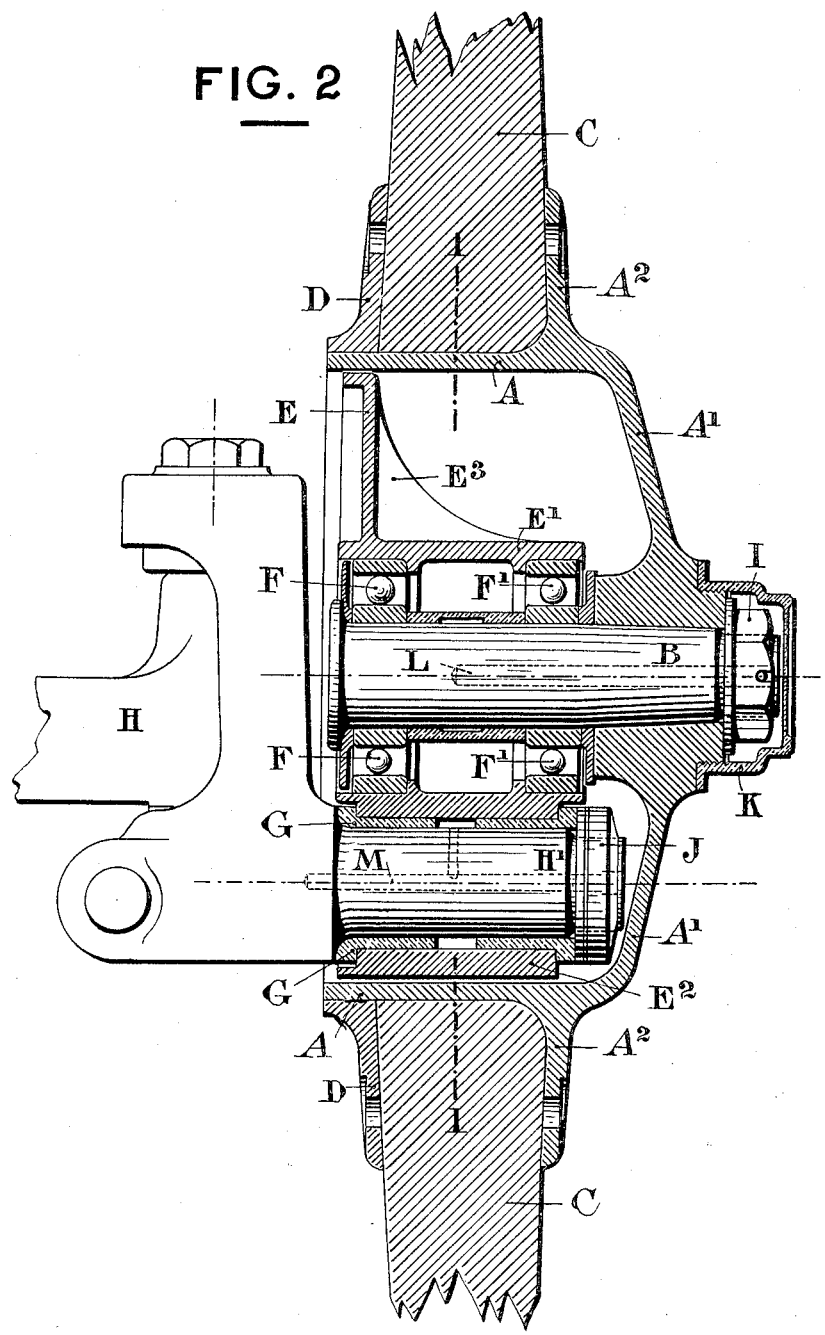

UNITED STATES PATENT OFFICE.

MARIE JEAN FRANÇOIS GENILLON, OF LYON, FRANCE.

VEHICLE-WHEEL.

1,102,492.  Specification of Letters Patent.  Patented July 7, 1914.

Application filed December 30, 1912. Serial No. 739,322.

*To all whom it may concern:*

Be it known that I, MARIE JEAN FRANÇOIS GENILLON, a citizen of the French Republic, residing at Lyon, in France, have invented certain new and useful Improvements in Vehicle-Wheels, of which the following is a specification.

This invention relates to improvements in resiliently mounted vehicle wheels.

The improved wheel is of the kind wherein the hub is constructed to permit a rocking movement of the wheel pivot to take place about an axle pin eccentric thereto so that said pivot can give when an obstacle is encountered.

The invention is illustrated in the annexed drawings, in which—

Figure 1 is a section of a wheel constructed according to the invention taken on line 1—1 of Fig. 2, and Fig. 2 is a section on the line 2—2 of Fig. 1.

The hub comprises a cylindrical casing A, the end wall $A^1$ of which is strengthened and bored at its center for the passage of the wheel pivot B. The spokes C of the wheel are carried by said casing to which they are secured by means of a separate annular plate D and a flange $A^2$ of the casing connected together by bolts.

In the casing A at the side thereof opposite the wall $A^1$ is a plate E having an extension in the form of a double interior sleeve $E^1$, $E^2$, strengthened by ribs $E^3$. The sleeve $E^1$ is mounted on ball bearings F, $F^1$ on the pivot B while the sleeve $E^2$ provided with packing sleeves or liners G is traversed by the pin $H^1$ of the axle H.

I and J respectively designate fixing nuts for the pivot B and the pin $H^1$ respectively and K indicates the usual cap for the wheel pivot.

L and M are oil holes in the pivot B and axle pin $H^1$ respectively.

The drawings show the application of the invention to the steering wheels of an automobile vehicle. For the driving wheels the pivot B is carried by a Cardan head connected to the shaft of the differential gear when the transmission is made by means of a Cardan joint. A chain transmission and toothed wheels with suitable chain tensioning means could however be used. The axle H in this construction would be curved in order to allow passage of the driving shaft, but the construction of wheel would remain as described.

The operation of the improved wheel is as follows:—During normal traveling the parts occupy the position shown in the drawings, the axes of the pivot B and of the pin $H^1$ of the axle being substantially in the same vertical plane. When however the wheel encounters an obstacle, the reaction produced has the effect of causing the axis of the pivot B to describe an arc of a circle around the axis of the pin $H^1$ taken as the center and when the obstacle is passed the pivot B returns to its original position at the same time performing an oscillating movement around the pin $H^1$ which remains practically in the horizontal plane of translation. Shocks are consequently not transmitted to the axle H or the vehicle which it supports, or if said shocks are transmitted they are reduced to a minimum and have no disturbing effect on said vehicle.

What I claim as my invention and desire to secure by Letters Patent of the United States is:—

1. A vehicle wheel comprising in combination a hollow hub strengthened at its center and open at one side, means carried by said hub for supporting the wheel spokes, a double sleeve comprising an upper and a lower member projecting laterally into said hub, the upper member of said sleeve being concentric to said hub and the lower member eccentric thereto, and tangential therewith at its lowest point, a non-rotatable axle pin journaled in said eccentric sleeve member, a pivot fixed in said strengthened center of said hub and extending axially through said concentric sleeve member and ball bearings between said pivot and said last mentioned sleeve member, said pivot being capable of oscillation about the axis of said axle pin as center.

2. A vehicle wheel comprising in combination a hollow hub strengthened at its center and open at one side, a flange on the periphery of said hub, a detachable annular plate on the periphery of said hub, means for securing the wheel spokes between said flange and said annular plate and for securing the latter in position, a dust resisting plate within said hub at the open side thereof, a double sleeve comprising an upper and a lower member integral with said plate and projecting laterally therefrom within said hub, the upper member of said sleeve being concentric to said hub and the lower member eccentric thereto and tangential therewith at its lowest point, a non-rotatable axle pin journaled in said eccentric sleeve member, a pivot fixed in said strengthened center of said hub and extending axially through said concentric sleeve member and ball bearings between said pivot and said last mentioned sleeve member, said pivot being capable of oscillation about the axis of said axle pin as center.

In witness whereof I have signed this specification in the presence of two witnesses.

MARIE JEAN FRANÇOIS GENILLON.

Witnesses:
JEAN GERMAIN,
GUILLAUME PIOCHE.

Copies of this patent may be obtained for five cents each, by addressing the "Commissioner of Patents, Washington, D. C."